Figure 1:
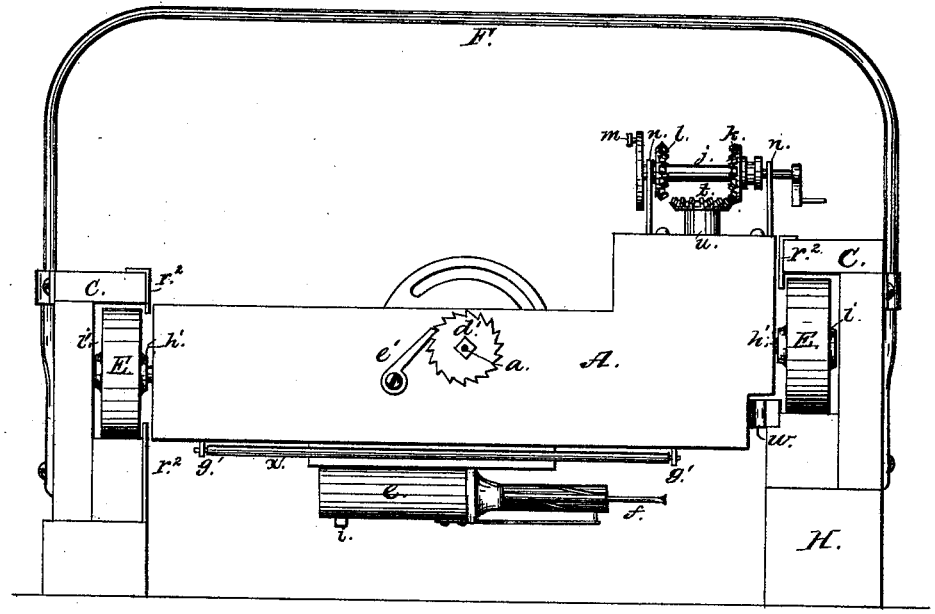

4 Sheets—Sheet 1.

N. J. GREEN.
STONE-CHANNELING MACHINES.

No. 181,066. Patented Aug. 15, 1876.

Witnesses:
William Batchelder
George Thompson

Inventor:
Nahum J. Green
By Atty
James N. Edmunston

N. J. GREEN.
STONE-CHANNELING MACHINES.
No. 181,066. Patented Aug. 15, 1876.
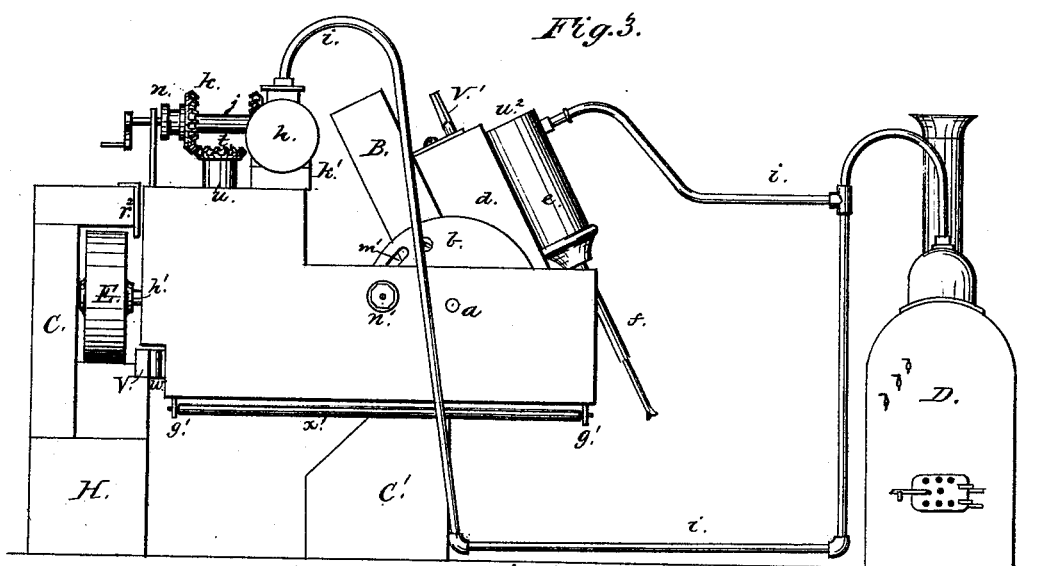
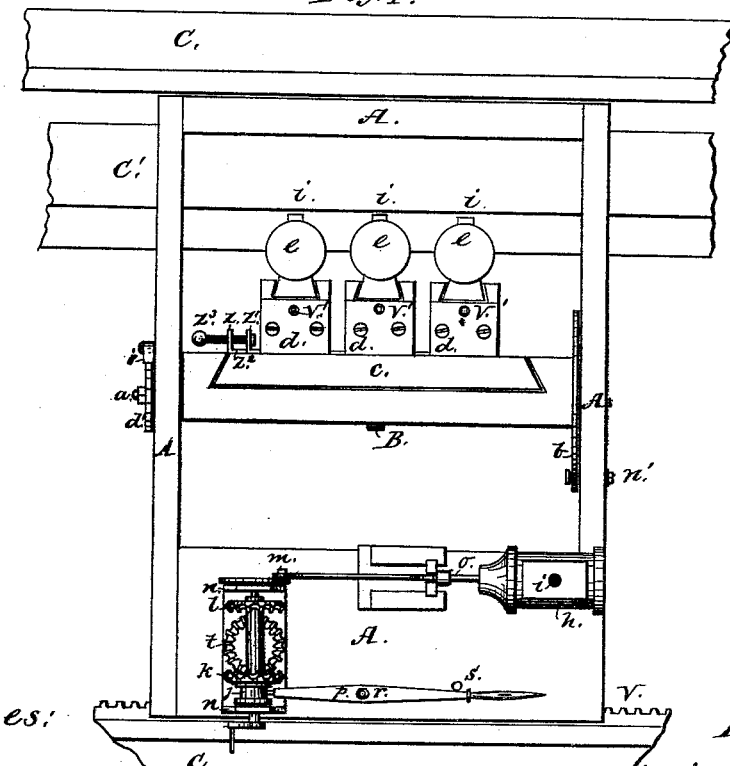
Witnesses:
William Batchelder
George Thompson
Inventor:
Nahum J. Green
By Atty
James N. Edmister

N. J. GREEN.
STONE-CHANNELING MACHINES.

No. 181,066. Patented Aug. 15, 1876.

Witnesses:
William Batchelder
George Thompson

Inventor:
Nahum J. Green
By Atty
James N. Edminster

N. J. GREEN.
STONE-CHANNELING MACHINES.
No. 181,066. Patented Aug. 15, 1876.
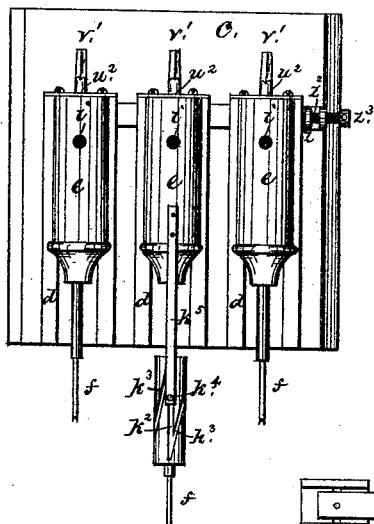
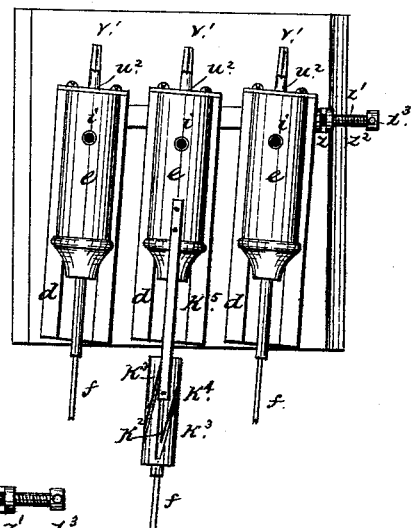
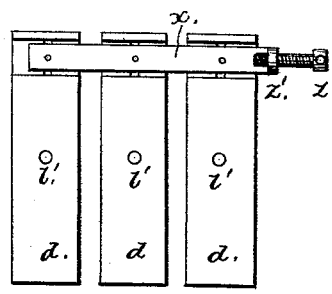
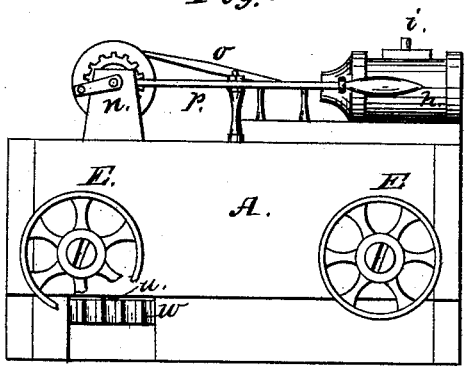
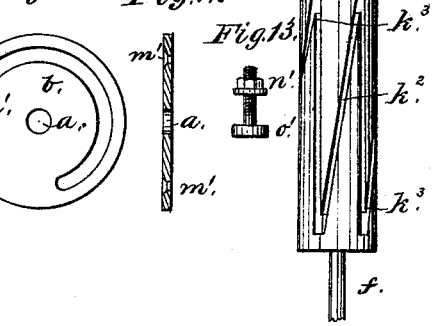
Witnesses:
William Batchelder
George Thompson
Inventor:
Nahum J Green
By Atty
James N Edmister

UNITED STATES PATENT OFFICE.

NAHUM J. GREEN, OF RUTLAND, VERMONT, ASSIGNOR OF ONE-HALF HIS RIGHT TO JOHN B. REYNOLDS, OF SAME PLACE.

IMPROVEMENT IN STONE-CHANNELING MACHINES.

Specification forming part of Letters Patent No. 181,066, dated August 15, 1876; application filed March 10, 1876.

*To all whom it may concern:*

Be it known that I, NAHUM J. GREEN, of Rutland, in the county of Rutland and State of Vermont, have invented a new and useful Improvement in Stone-Channeling Machines, which improvement is fully set forth in the following specification, reference being had to the accompanying drawings.

The invention relates to machines for channeling stone in the quarries, where it is desirable to cut grooves or channels of any length in the bed or stratum of the stone as it lies in the quarries, and which are used upon a way-guide or track of any length.

The invention consists in applying two or more single cutters or drills to an adjustable plate or frame-work, in such a manner that they can be worked independently of each other, fed up to, or withdrawn from, their work at the will of the operator, and can also be adjusted laterally at any angle in which it may be desirable to cut the stone or work the drills. It further consists in providing for the adjustment of the cutters longitudinally, so that they can be made to deliver blows at any desirable angle with the bottom of the cut, and what is known in the art as "chipping blows."

Hitherto the machines employed in doing this kind of work have been constructed with gangs of chisels, consisting of from three to ten chisels, clamped rigidly together, and being of great weight.

In the use of these machines several very serious objections exist, especially when used upon marble and slate. One objection is, that the gangs of cutters are so heavy as to injure the texture of the stone, oftentimes to a great extent, by checking. Sometimes this checking extends from one to four inches in, all over the surface cut, and in the finer qualities of stone this loss is very great; and it is true that in the present state of the art the drill, in the hands of a careful hand-cutter, is superior to any known machine for cutting the better qualities of stone. When these gangs are used, the stone that forms the cut, and is removed by the cutters to make the channel, must be ground to powder, thereby expending a large amount of power and force, which can be saved by delivering a blow so as to chip up the stone, to be removed in chips. In fact, the gang of drills crush out a channel, instead of cutting or drilling it out.

Another objection is the great weight of the machine necessary to give sufficient strength to the working parts. This is a very serious objection. These machines are worked in quarries of great depth, and the only means usually adopted for moving them is by the use of derricks on the bank, unless they are in use beyond the reach of the derricks, in which case they are moved by hand. In either case a great amount of time and expense is required to move them.

Another objection is that, the gangs being of such great weight, a great amount of power is required to operate them.

Another serious objection is that these machines do not cut up to the ends of the channels readily and easily. In the first place, it is necessary to drill a hole at the ends of the channel, to be cut as deep as the desired channel. Should this not be done, it would be impossible to cut the channel down square at the ends with these machines. The natural tendency of the channeling-machine, which operates with reciprocating cutters, is to slide back from the work at the ends of the channel; and without these holes being first drilled at the ends, there is left at both ends, when the machine has cut the desired depth at the other parts of the channel, a large amount of the rock, to be removed by hand-channeling.

Again, as the extreme ends of the channel do not get the benefit of all the cutters, as used in the present machines, the channel soon grows deeper in the middle than at and near the ends; and in order to keep the bottom of the cut level, or the channel of uniform depth, it is necessary, in the use of these machines, to go back and forth over those parts until the right depth is reached. This oftentimes consumes a large amount of time. In many instances it cannot be done with the machine, and then it becomes necessary to resort to hand-labor to complete the cuts.

By my invention these difficulties are wholly overcome.

By the use of the single cutters, independently, there is no damage done to the stone quarried. The blows are light and quick, and correspond with the drill in the hands of a hand-cutter.

By providing for adjusting the cutter longitudinally they are enabled to give a blow at any desired angle with the bottom of the cut, and what is called a chipping-blow, thereby taking out the stone to be removed in chips, instead of in fine powder, and thereby enabling two or three single cutters, with much less power, to do a corresponding amount of cutting.

By providing this adjustment the operator is enabled to turn the cutters into the ends of the channels as the machine approaches, and to thereby cut them down square, dispensing with the drill-hole at the ends of the channel, and to thereby keep the bottom of the channel at the ends as low as the center without running the machine back and forth over the spot.

By the mode of adjustment which I have adopted, it will be seen that the cutters are all kept the same relative length, and when adjusted at any angle within which they are designed to work, the cutters are kept at the same distance from the surface-cut.

The weight of my machine is not more than one-eighth the weight of the machines now in use.

In quarrying marble or slate, it is necessary to tunnel in over the layers or strata to be cut. This tunnel is made by blasting in and removing the waste material to the depth of about eight feet, in order to allow the use of any machine now used.

My machine will easily work in a tunnel of four feet in depth.

My invention further consists in providing means for removing the ridges left in the bottom of the channel, as is usual when single reciprocating cutters are used.

To enable others skilled in the art to construct and use my improvement, I will proceed to describe it.

Similar letters of reference in the annexed drawings refer to like parts.

Figure 2:
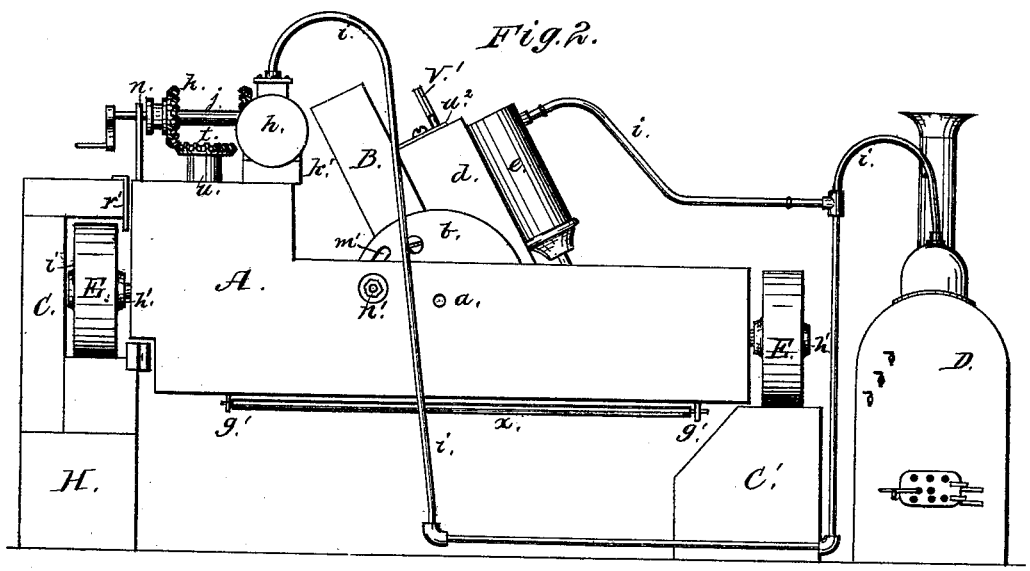
Figure 5:
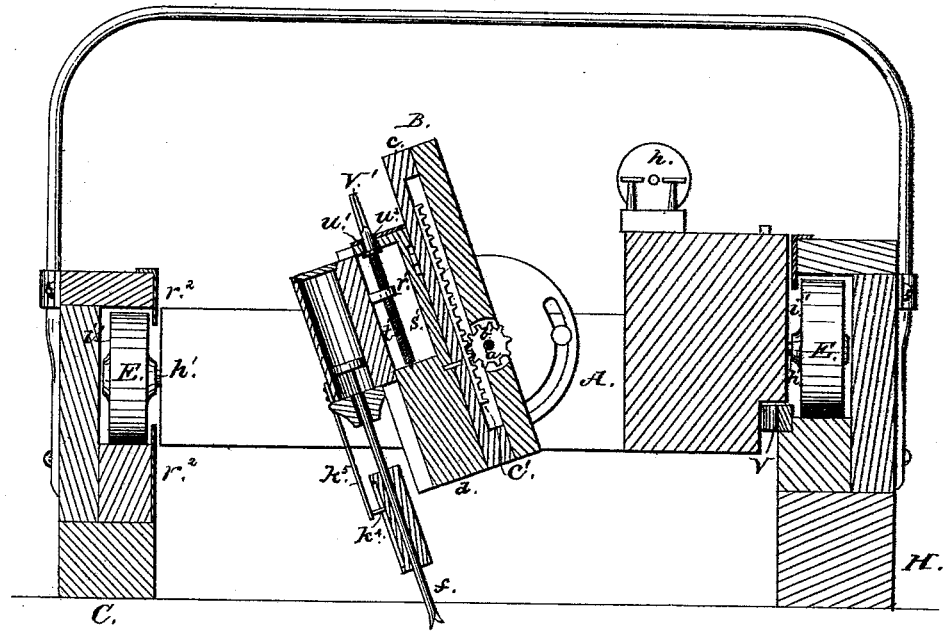
Figure 6:
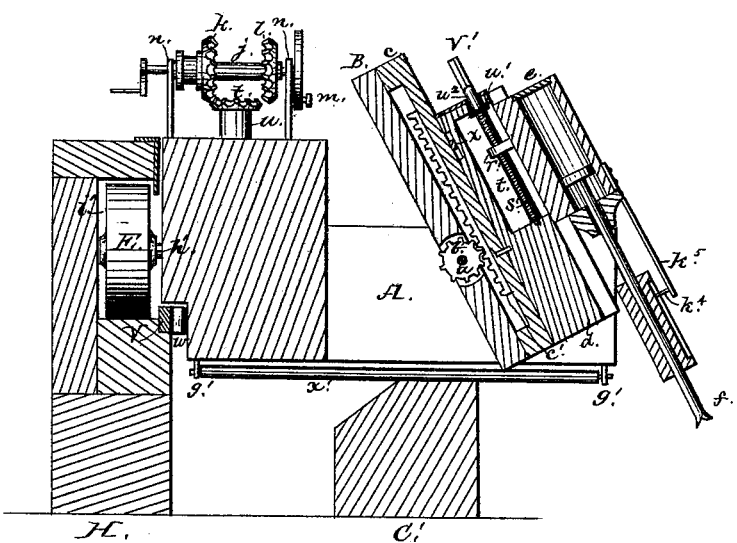

Figure 1 is an end view of the machine as it stands upon its track or ways, with the cutters so adjusted as to cut under the track upon which the machine moves. Fig. 2 is the opposite end view, with the cutting devices upon the inside of the track upon which the machine moves, and showing another form for the track upon one side of the machine. Fig. 3 is a similar view, with the track adjusted so that the cutting devices are outside the track. Fig. 4 is a top view. Figs. 5 and 6 are transverse sectional views of the machine, as shown, respectively, in Figs. 1 and 3. Figs. 7 and 8 are front views of the cutting-chisels and the bed-plate to which they are attached. Fig. 9 shows the back side of the cylinder-beds and the manner of attaching them to the adjustment-rod. Fig. 10 is an upright side view of the machine without its track. Fig. 11 shows an adjustment-plate, which I use to set the carriage which carries the cutters at the desired angle. Fig. 12 shows a transverse sectional view of the adjustment-plate. Fig. 13 shows the bolt used in connection with the adjustment-plate. Fig. 14 shows the device used for turning the drill.

A is the main frame of the machine, to which is attached, on each side of the machine, two trucks or wheels, E, by axles $h'$. These trucks or wheels move in the cavities or grooves $i'$, Figs. 1 and 5, as the machine is fed upon its track C, back and forth, in doing its work. The track C is made by making a recess in the inward side of the track-wood, large enough to permit the wheels of the machine to move freely therein, and by securing to the inner side of the said track-wood strips of metal or wood, which extend partially over the said recess, as at $r^2$, thereby forming the cavities $i'$.

In my drawings, the rack-bar V serves for the bottom strip upon one side of the machine. Instead of making the track-wood of one piece of timber, it can be made of two or three pieces by their being so secured together as to form the said recess.

The cavities or grooves $i'$ are the most complete guides to the machine, I have ever seen.

The track or way upon the side of the machine represented by the left-hand side of the drawing in Figs. 1 and 5 may be dispensed with, and the form of track $C'$ be used, as shown in Figs. 2, 3, and 6. The trucks which are shown on the side of the machine represented at the left hand of Figs. 1 and 6 are adjustable upon their axles for the purpose of permitting them to apply themselves to the track, in case this portion of the track should not be placed parallel with the track upon the other side of the machine.

The track or way upon which the machine moves can be placed upon posts, as seen at H; this, however, is not necessary.

The track can be placed upon the floor of the quarry and secured thereto.

This track is made in sections, to suit the convenience of the quarrymen, and is braced or held together by the use of iron rods F, when the form shown in Figs. 1 and 5 is used. The machine works equally well upon the form shown by $C'$.

When it is desired to work the cutters outside the track, as in Fig. 3, the form of track $C'$ is used, and the movement of the machine is aided by the use of the long roller $x'$, which is attached to the frame A by posts or studs $g'$, and moves along upon the track $C'$, as shown in Figs. 3 and 6. Within the main frame A is hung the movable carriage B, by means of a trunnion-rod, $a$, passing loosely through the same, and resting in proper bearings.

To the carriage B is firmly attached an adjustment-plate, $b$, having a slot, $m'$, passing nearly (or wholly, if considered necessary) around it. The edges of this slot are beveled back so as to permit a bolt-head being beveled like the head of an ordinary screw, to come even with the surface of the plate $b$. This bolt passes through the slot $m'$, and through the frame A, and receives a nut, $n'$. By loosening the nut $n'$, the bolt will relieve the plate $b$, and the carriage B can be turned to any angle desired, the bolt sliding freely through the slot $m'$.

By tightening the nut $n'$ the plate $b$ is drawn upon the frame A, and holds the carriage B securely in position.

It will be seen that by this means I can adjust my drills at any desired position, as in Fig. 1 they are shown in position to cut underneath the track, the track being elevated upon supports H.

To the carriage B is fitted a bed piece or plate, $c$, upon the inner side of which is a rack, $c'$, (seen in Figs. 5 and 6,) and into this pinion works the cogged wheel $b'$, which is rigidly attached to the trunnion-rod $a$. One end of the trunnion-rod $a$ is made square, and is provided with a ratchet-wheel, $d'$, and pawl $e'$. (Seen in Figs. 1 and 4.) By applying a wrench or crank to the square end of the rod $a$, and turning the same either way, the pinion $b'$, Figs. 5 and 6, works into the rack $c'$, and moves the bed-plate $c$ in the direction the wrench or crank is turned.

In operating the machine, when it becomes necessary to move the cutters up to their work, the operator has only to apply his wrench to the square end of the trunnion-rod $a$, raise the pawl $e'$, and turn it, in the direction the chisels are working, the desired distance, and drop the pawl $e'$ into the ratchet-wheel $d'$, and the cutters are held firmly in place. To withdraw the cutters from their work, the operator has only to turn his wrench in the opposite direction.

To the bed-piece $c$ the engine-beds $d$ are attached by means of bolts $l'$ passing through both the engine-beds $d$ and the bed-piece $c$ at or near the center of the engine-beds, as seen at $l'$, Fig. 9, and adjusted so as to permit them to be easily moved thereon. The engine-beds $d$ are supplied with cylinders $e$, to which are attached any of the known devices of single drill in any of the known ways. In my drawing I represent the drills at $f$. Each cylinder is adjustable upon its own bed, and so constructed as to be adjusted up or down independently of the other cylinders. For this purpose the engine-bed $d$ is provided with a recess, $t'$, and a screw-rod, $s'$, is placed therein. This screw-rod is attached to the engine-bed at the top of the recess $t'$ by means of the collars $u'$, which are fastened rigidly to the said screw-rod, and so adjusted as to permit the screw-rod to be easily turned. The top end of the screw-rod $v'$ is formed square, so that a wrench will fit onto it. To the back of the cylinder $e$ is secured a nut, $r^1$, which extends back into the recess $t'$, and works upon the screw-rod $s'$. To adjust the cylinder and its chisel up or down, the operator has only to apply a wrench or crank to the end of the screw-rod at $v'$, and turn the rod in the direction it is desired to move the cylinder. The nut $r'$ being fastened to the cylinder, and working upon the rod $s'$, when the rod $s'$ is turned the cylinder is moved.

It will be seen that the drills can easily be shortened or lengthened independently of each other by simply moving the cylinder.

To the engine-beds $d$ is attached on the back, in recesses sufficiently large made therein, and near their upper ends, an adjustment-rod, $x$, (seen in Fig. 9,) by means of bolts, which are applied loosely, so as to permit the play necessary to admit of the beds being turned out of the perpendicular. The end of this adjustment-rod $x$ is turned, as at $z^1$ in Fig. 4, to which is secured loosely the long screw $z^3$, so arranged as to turn in the end $z^1$. The screw $z^3$ passes through the post $z$, which is provided with a nut for the screw $z^3$ to work in. The post $z$ is formed by turning the end of a strap of metal, $z^2$, of convenient size, at a right angle, and properly tapping it. The other end of the strap is fastened securely to the plate $c$. This strip of metal should be made of such a length as to bring the post $z$ near the center of the screw-rod $z^3$ when the engine-beds stand square on the plate $c$. The screw-rod $z^3$ and strap $z^2$ may be of any length sufficient to give the engine-beds the desired longitudinal movement. Fig. 7 shows the engine-beds lying square upon the bed-plate $c$, and Fig. 8 shows the engine-beds turned at an angle.

The only thing for the operator to do in order to adjust the engine-beds and cylinders, and the drills attached, at any desired angle longitudinally, is to turn the screw $z^3$.

It will be seen that the points of the drills, when adjusted at any desirable angle, retain their relative position, each being the same distance from the surface-cut.

For the purpose of removing the ridges in the bottom of the channel, I construct one of my drills with a rotary motion, so that it will strike in different positions and across the ridges, and thus chip them out. In the drawings I represent the middle drill as so arranged. The mode I have adopted is to provide the drill with a drum or barrel, fastened securely thereto, and provided with four grooves, $k^2$, passing diagonally around at equal distances from each other, and also provided with an equal number of parallel grooves, $k^3$, all meeting each other at the ends, into which a pin, $k^4$, is made to work. The pin $k^4$ is attached to a spring, $k^5$, which is fastened to the cylinder. The diagonal grooves at the end nearest the cylinder are made deeper than the parallel grooves at the same end, and the parallel grooves at the opposite end are made deeper than the diagonal grooves at that end.

When the drill is moved up and down, the pin $k^4$ passes over the grooves $k^2$ and $k^3$, and when it passes beyond the shallow end of either groove it falls into the other deeper end of the other groove, and follows that groove to the opposite and shallow end, when it falls into the deeper end of another groove, and follows that groove, and so on, giving to the drill an intermittent rotary motion.

For the purpose of removing these ridges, instead of using a drill, which is made to rotate, I use a drill with a double or + point. The middle drill, in my drawings, is made in this form. This form of drill does that work as well as the drill which is made to rotate. If the necessity requires, more than one rotating drill or more than one of the +-points can be used.

The feeding mechanism which I have adopted is worked by an engine separate from the engines which work the cutters.

It is described as follows: $h$ is an engine, which, together with its bed $k'$, is firmly secured to the main frame of the machine A. $o$ is a rod connecting the engine with the crank $m$ within the sleeve $j$, which is supported on the posts $n\ n$, also secured to the main frame of the machine A. The sleeve $j$ is provided with the two bevel-gears $k$ and $l$, which are made to work into the bevel-gear $t$ alternately, as it becomes desirable to move the machine backward or forward. The gear $t$ is at the end of a shaft or rod, $u$, which extends downward through the frame of the machine, and at its lower end is provided with the cogged wheel $w$. (Seen in Fig. 10.) This cogged wheel works in the toothed rack V on the side of the track C.

It will be readily seen that, by the application of power to the sleeve $j$ at the arm $m$ through the connecting-rod $o$ from the engine $h$, either of the gears $k$ or $l$ will work into the gear $t$, and thus turn the rod $u$ with its cogged wheel $w$, which, by working into the toothed rack V, will move the machine along the track.

The gears $k$ and $l$ are placed at such a distance apart on the sleeve $j$ as to permit the gear $t$ to revolve between them without working into either. The lever $p$ is hung on the the pin $r$ loosely, so that it can be easily turned thereon, and loosely attached to the sleeve $j$ by means of the end of the lever $p$ passing onto it.

Whenever it is desirable to reverse the motion or feed of the machine, it is done by placing the long end of the lever $p$ on the opposite side of the pin $s$, which holds it firmly, thereby changing the gears $k$ and $l$ by throwing one out and the other into the gear $t$.

In case it is desired to suspend the motion of the machine on its track, the lever $p$ is moved until the gear $t$ revolves between the gears $k$ and $l$ without working into either, and the motion of the machine along the track is suspended.

Steam is communicated to the cylinders $e$ and $h$, through the flexible tube $i$, from the boiler D, which can be placed in any convenient position.

Having thus fully described my invention, what I claim, and desire to secure by Letters Patent, is—

1. A stone-channeling machine which works upon ways of any length, having two or more single reciprocating cutters, which operate independently of each other, and are attached to an adjustable mechanism, said adjustable mechanism being arranged to feed the cutters up to or withdraw them from their work at the will of the operator, and arranged to adjust the cutters laterally at any desirable angle for cutting the rock, the cutters also being so arranged as to permit of their collective adjustment longitudinally with the cut or channel either way from a perpendicular, substantially as and for the purposes specified.

2. The combination of two or more single reciprocating cutters, which operate independently of each other, with their engines, a mechanism for adjusting collectively the cutters longitudinally with the cut or channel, the adjustable mechanism composed of the two parts B and C, said mechanism for feeding the cutters up to or to withdraw them from their work, and for adjusting the same with the cutters and engines at any desirable angle for cutting, and a feeding mechanism for feeding the machine along its ways, substantially as and for the purposes specified.

3. The cutters in a stone-channeling machine, having two or more single independently-working reciprocating cutters, adapted to a longitudinal adjustment either way from a perpendicular, substantially as and for the purposes specified.

4. The combination, in a stone-channeling machine having two or more single independently-working reciprocating cutters, of one or more rotating drills with one or more drills which do not rotate, substantially as and for the purposes specified.

NAHUM J. GREEN.

In presence of—
JACOB EDGERTON,
FRANCIS A. FISHER.